US008596248B2

(12) United States Patent
Eser et al.

(10) Patent No.: US 8,596,248 B2
(45) Date of Patent: Dec. 3, 2013

(54) METHOD AND DEVICE FOR CONTROLLING AN INTERNAL COMBUSTION ENGINE WITH AN AUTOMATIC ENGINE CUT-OFF AND STARTING SYSTEM

(75) Inventors: Gerhard Eser, Hemau (DE); Balaji Jayaraman, Coventry (GB); Andreas Läufer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 497 days.

(21) Appl. No.: 12/988,547

(22) PCT Filed: Mar. 20, 2009

(86) PCT No.: PCT/EP2009/053323
§ 371 (c)(1),
(2), (4) Date: Oct. 19, 2010

(87) PCT Pub. No.: WO2009/130098
PCT Pub. Date: Oct. 29, 2009

(65) Prior Publication Data
US 2011/0040477 A1    Feb. 17, 2011

(30) Foreign Application Priority Data
Apr. 22, 2008    (DE) .......................... 10 2008 020 185

(51) Int. Cl.
*F02D 7/00*    (2006.01)
(52) U.S. Cl.
USPC ............. 123/481; 123/179.4; 123/198 F; 123/325; 123/694; 701/112
(58) Field of Classification Search
USPC ......... 123/481, 434, 678, 686, 690, 694, 695, 123/198 F, 325, 179.1, 179.4; 701/101, 103, 701/104, 112, 113
See application file for complete search history.

(56) References Cited

U.S. PATENT DOCUMENTS

| 4,539,643 A | * | 9/1985 | Suzuki et al. ................. 701/112 |
| 5,483,941 A | * | 1/1996 | Cullen et al. .................. 123/481 |
| 5,638,802 A | * | 6/1997 | Maki et al. ..................... 123/675 |
| 6,128,948 A |   | 10/2000 | Shi et al. ...................... 73/118.1 |

(Continued)

FOREIGN PATENT DOCUMENTS

| EP | 1223324 | 7/2002 | ............. F02D 41/04 |
| EP | 1591648 | 11/2005 | ............. F02D 29/00 |
| WO | 2007/104840 A1 | 9/2007 | ............. F02D 11/08 |

OTHER PUBLICATIONS

International Search Report and Written Opinion for Application No. PCT/EP2009/053323 (13 pages), Jul. 7, 2009.

*Primary Examiner* — John Kwon
(74) *Attorney, Agent, or Firm* — King & Spalding L.L.P.

(57) ABSTRACT

In a control method suitable for an internal combustion engine (1) of a motor vehicle with an automatic engine cut-off and starting system (33) by which the internal combustion engine (1) can be cut off and started independently from the driver of the motor vehicle, the starting of the internal combustion engine (1) is detected and a variable determined, which represents a measure for the work performed by the internal combustion engine (1) since it has been started. The cut-off of the internal combustion engine (1) is controlled by the automatic engine cut-off and starting system (33) according to the variable.

20 Claims, 2 Drawing Sheets

(56) References Cited

U.S. PATENT DOCUMENTS

| | | | |
|---|---|---|---|
| 6,230,486 B1 * | 5/2001 | Yasui et al. | 60/285 |
| 6,292,739 B1 * | 9/2001 | Yasui et al. | 701/109 |
| 6,615,578 B2 * | 9/2003 | Yamazaki et al. | 60/284 |
| 6,675,088 B2 | 1/2004 | Miki | 701/112 |
| 6,829,887 B2 | 12/2004 | Suzuki et al. | 60/284 |
| 7,497,195 B2 | 3/2009 | Umezu et al. | 123/179.4 |
| 7,801,663 B2 | 9/2010 | Denis | 701/102 |
| 8,335,639 B2 * | 12/2012 | Bruns et al. | 701/123 |
| 2002/0189595 A1 * | 12/2002 | Iwasaki | 123/491 |
| 2003/0106515 A1 * | 6/2003 | Kondo | 123/179.4 |
| 2006/0021326 A1 * | 2/2006 | Midlam-Mohler | 60/278 |

* cited by examiner

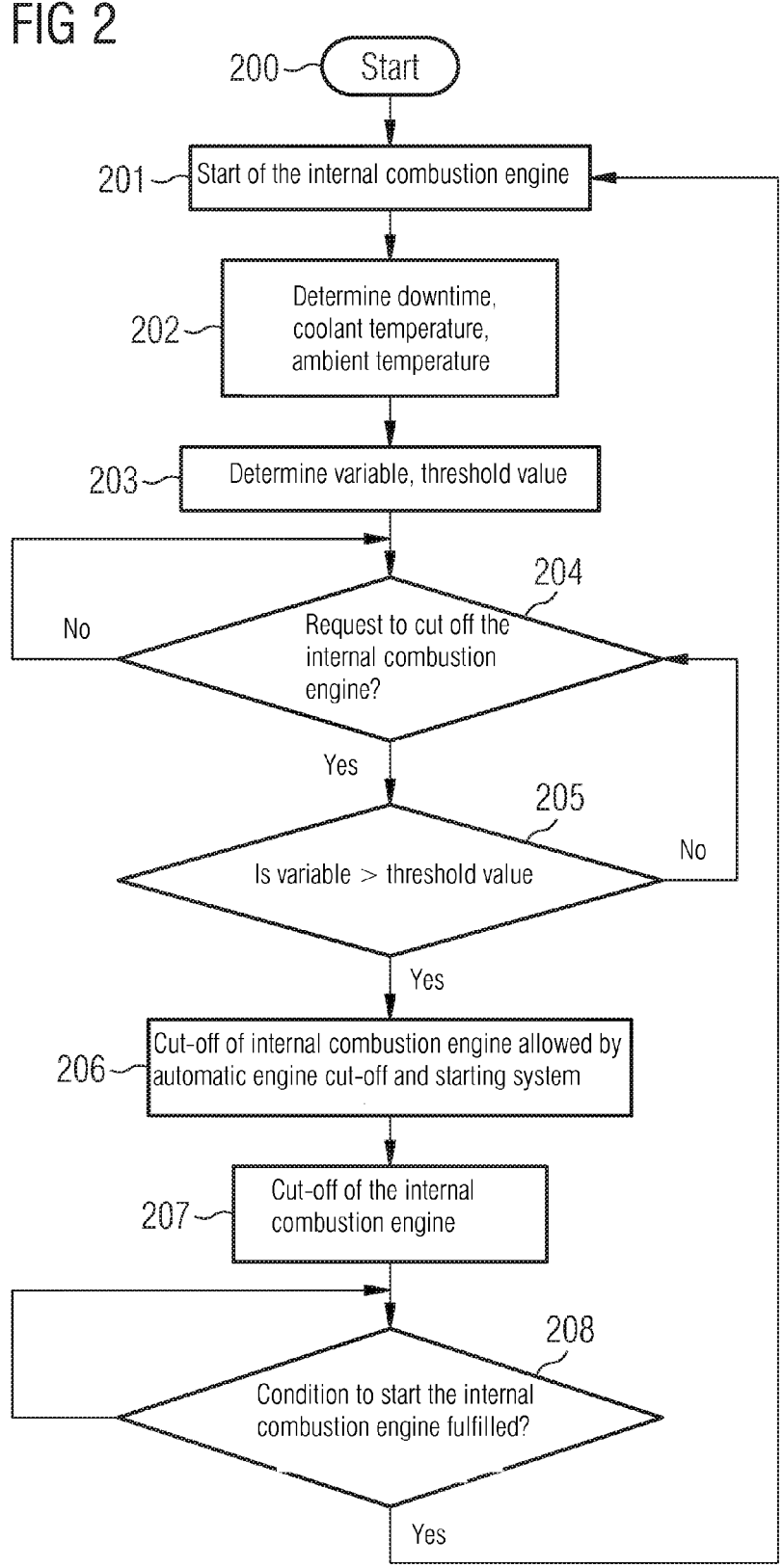

METHOD AND DEVICE FOR CONTROLLING AN INTERNAL COMBUSTION ENGINE WITH AN AUTOMATIC ENGINE CUT-OFF AND STARTING SYSTEM

CROSS-REFERENCE TO RELATED APPLICATIONS

This application is a U.S. National Stage Application of International Application No. PCT/EP2009/053323 filed Mar. 20, 2009, which designates the United States of America, and claims priority to German Application No. 10 2008 020 185.5 filed Apr. 22, 2008, the contents of which are hereby incorporated by reference in their entirety.

TECHNICAL FIELD

The invention relates to a method and device for controlling an internal combustion engine with an automatic engine cut-off and starting system, by means of which the internal combustion engine is cut off and started independently from the driver of the motor vehicle.

BACKGROUND

To reduce the fuel consumption and the pollutant emissions, different concepts are realized in modern motor vehicles which improve the degree of efficiency of the internal combustion engine, the exhaust gas purification or the aerodynamics of the motor vehicle. The implementation of a so-called automatic engine cut-off and starting system also belongs to these concepts, by means of which the internal combustion engine can be cut off and started again independently from the driver of the motor vehicle. The internal combustion engine is cut off here particularly during longer idling phases, in which the driving force of the internal combustion engine is not needed.

Notable reductions in fuel consumption can be achieved in this way in urban driving cycles for instance.

The cut-off of the internal combustion engine by the automatic engine cut-off and starting system is however subject to restrictions. For instance, the cut-off of the internal combustion engine can then be prevented if safety aspects (e.g. the maintenance of an adequate braking pressure) or a too minimal battery voltage require further operation of the internal combustion engine. It is also worthwhile for the internal combustion engine to reach an operating temperature as quickly as possible after start-up, whereby optimal conditions in respect of the power output, degree of efficiency and emission behavior prevail. In this respect it is known to prevent the cut-off of the internal combustion engine by means of the automatic engine cut-off and starting system until a certain operating temperature has been reached, so as not to slow down the heating process. The output signal of the coolant temperature sensor is knowingly used as a measure of the temperature of the internal combustion engine. The actual temperature of the internal combustion engine is only inadequately represented by the coolant temperature in the case of specific configurations and/or operating states. The internal combustion engine may have an auxiliary heating system, which heats the coolant to clearly higher temperatures, like the actual engine block. This method also assumes the presence of a fully functional coolant temperature sensor, so that this procedure cannot be used in the absence of or with a defect in the coolant temperature sensor, or may result in malfunctions.

SUMMARY

According to various embodiments, an alternative method and a meaningful apparatus for controlling an internal combustion engine for a motor vehicle having an automatic engine cut-off and starting system can be provided.

According to an embodiment, a method for controlling an internal combustion engine for a motor vehicle having an automatic engine cut-off and starting system, by means of which the internal combustion engine can be cut off and started independently from the driver of the motor vehicle, comprises—detecting a start-up of the internal combustion engine,—determining a variable, which represents a measure of the work performed by the internal combustion engine 1 since the start-up, and—cut-off of the internal combustion engine by the automatic engine cut-off and starting system as a function of the variable.

According to a further embodiment, the variable may be the quantity of fuel which was metered into the internal combustion engine since the last start-up. According to a further embodiment, the variable may be the fresh air quantity, which was fed to the internal combustion engine since the last start-up. According to a further embodiment, the torque produced by the internal combustion engine can be determined and the variable can be the temporal integral of the torque produced by the internal combustion engine since the start-up. According to a further embodiment, the cut-off of the internal combustion engine may take place by means of the automatic engine cut-off and starting system if the variable exceeds a predetermined threshold value. According to a further embodiment, the threshold value can be determined as a function of the temperature of a coolant of the internal combustion engine during start-up. According to a further embodiment, the threshold value can be determined as a function of the downtime of the internal combustion engine until the start-up. According to a further embodiment, the threshold value can be determined as a function of the ambient temperature of the motor vehicle during start-up.

According to another embodiment, a control device for an internal combustion engine of a motor vehicle having an automatic engine cut-off and starting system, which cuts off and starts the internal combustion engine independently from a driver of the motor vehicle, may be embodied such that—a start-up of the internal combustion engine is detected,—a variable is determined, which represents a measure of the work performed by the internal combustion engine since the start-up,—the cut-off of the internal combustion takes place by means of the automatic engine cut-off and starting system as a function of the variable.

BRIEF DESCRIPTION OF THE DRAWINGS

An exemplary embodiment is described in more detail below with reference to the appended figures, in which;

FIG. 2 shows an exemplary embodiment of a control method in the form of a flow chart.

DETAILED DESCRIPTION

Figure 1:
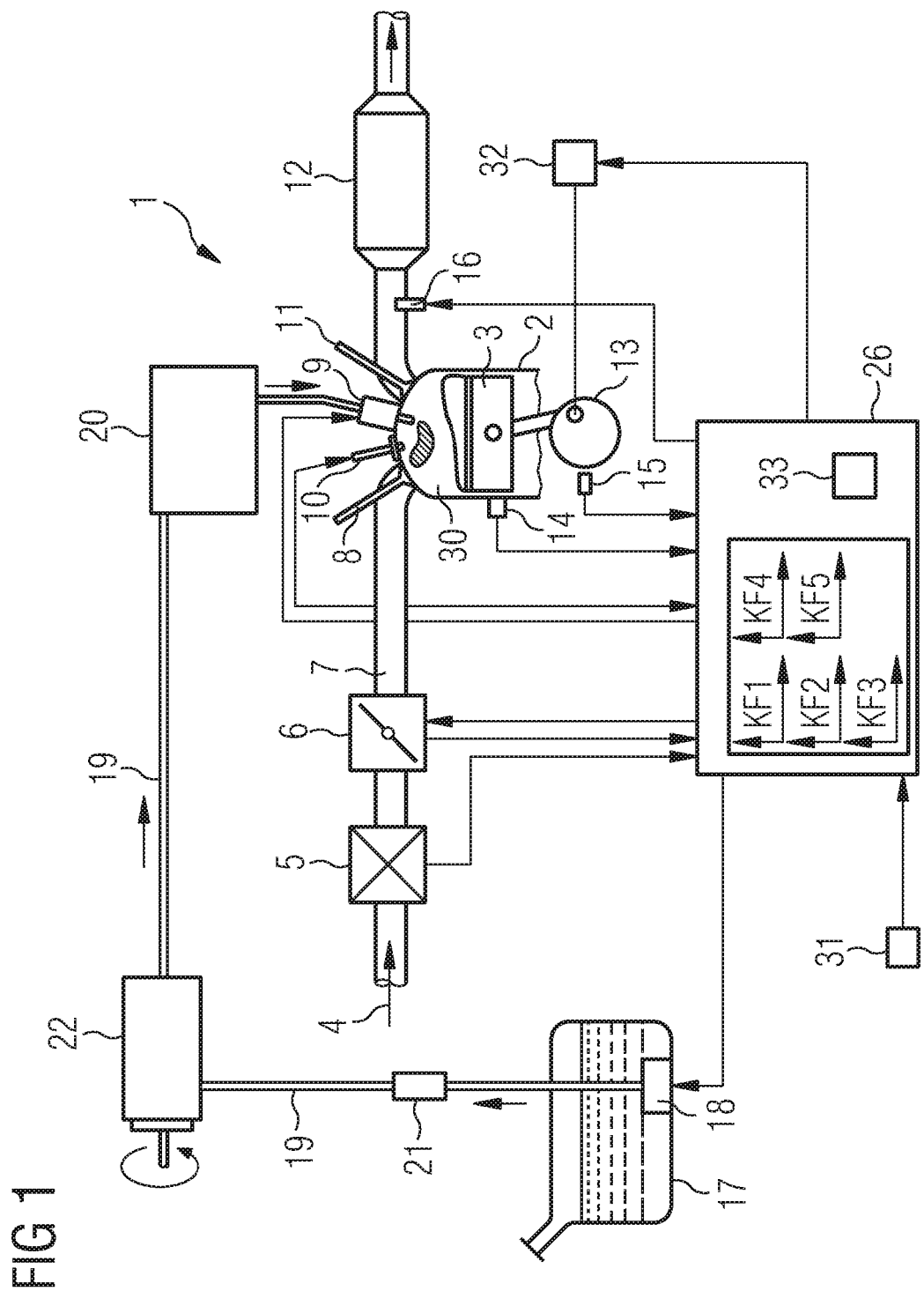
FIG. 1 shows a schematic representation of an internal combustion engine.

The method according to an embodiment is suited to controlling an internal combustion engine for a motor vehicle having an automatic engine cut-off and starting system, which cuts off and starts the internal combustion engine independently from the driver of the motor vehicle. According to the method, a start-up of the internal combustion engine is detected and a variable is determined, which represents a measure of the work performed by the internal combustion engine since the start-up. The cut-off of the internal combustion engine by means of the automatic engine cut-off and starting system takes place here as a function of the determined variable.

According to various embodiments, the work performed by the internal combustion engine and thus the heat input effected by the motor-driven combustion into the engine block is representative of the temperature of the internal combustion engine. There is therefore a direct connection between the variable representative of the work performed by the internal combustion engine since its last start-up and the temperature of the internal combustion engine. By determining this variable, a conclusion can therefore be drawn as to the temperature of the internal combustion engine. In accordance with various embodiments, the internal combustion engine is cut off by means of the automatic engine cut-off and starting system as a function of this variable. A cut-off of the internal combustion engine by the automatic engine cut-off and starting system may therefore be prevented and/or avoided as a function of this variable. As a result of this additional dependency, it may be possible for instance for a cut-off of the internal combustion engine by means of the automatic engine cut-off and starting system to be prevented in the case of excessively low temperatures in the internal combustion engine, so that the desired operating temperature can be reached more quickly. The method according to various embodiments functions independently from a coolant temperature sensor and is therefore also suited to configurations which either have no coolant temperature sensor or said sensor is defective. Since the variable represents the work performed by the internal combustion engine and therewith indirectly the heat input into the engine block, an estimation of the actual temperature of the internal combustion engine and/or the engine block as a function of this variable is possible with high precision. Malfunctions occurring for instance with a defective coolant temperature sensor, may therefore be avoided.

In one embodiment, the variable is a quantity of fuel, which was metered into the internal combustion engine since the last start-up.

In one embodiment of the method, the variable is the fresh air quantity, which was fed to the internal combustion engine since the last start-up.

In one embodiment of the method, the torque produced by the internal combustion engine is determined, with the variable being the temporal integral of the torque produced by the internal combustion engine since the start-up.

In one embodiment of the method according, the internal combustion engine is only cut off by means of the automatic engine cut-off and starting system if the variable exceeds a predetermined threshold value. Otherwise, the cut-off of the internal combustion engine is prevented by means of the automatic engine cut-off and starting system.

According to further embodiments of the method, the threshold value is determined as a function of the temperature of a coolant of the internal combustion engine prior to the start-up, as a function of the downtime of the internal combustion engine prior to the start-up or as a function of the ambient temperature of the motor vehicle prior to the start-up.

Various embodiments of the method ensure that the internal combustion engine is only then cut off by means of the automatic engine cut-off and starting system if the variable (representative of the work performed by the internal combustion engine since the start-up and thus of the heat input into the internal combustion engine as a result of the motor-driven combustion) has exceeded a certain predetermined threshold value. As a result, the automatic engine cut-off and starting system is then only active if the internal combustion engine has reached a desired operating temperature, as a result of which a possible speedy heating-up of the internal combustion engine is ensured. As a result, the degree of efficiency and the emission behavior of the internal combustion engine can be improved particularly after a cold start-up. The heat entry into the engine block which is needed in order to reach the desired operating temperature nevertheless varies as a function of the temperature of the internal combustion engine at the point in time of the start-up. This temperature can be easily estimated by the temperature of the coolant, the downtime of the internal combustion engine and by the ambient temperature of the motor vehicle prior to the start-up. As the threshold value is determined as a function of these variables, higher precision and greater flexibility thus result in terms of determining this threshold value. The period of time after the start-up, during which the cut-off of the internal combustion engine is prevented by means of the automatic engine cut-off and starting system, can be kept as short as possible according to the prevailing ambient conditions.

A control device according to an embodiment is suited to an internal combustion engine of a motor vehicle having an automatic engine cut-off and starting system, which cuts off and starts the internal combustion engine independently from a driver of a motor vehicle. The control device is embodied such that it is able to implement the method as described above. To this end, corresponding control functions are implemented in the control device using software. In respect of advantages produced by this control device, reference is made to the embodiments relating to the various embodiments of the method.

FIG. 1 shows a schematic representation of an internal combustion engine 1. The representation is shown significantly simplified for reasons of improved clarity.

The internal combustion engine 1 includes at least one cylinder 2 and a piston 3 which can be moved to and fro in the cylinder 2. The internal combustion engine 1 also includes an intake tract, in which an air mass sensor 5, a throttle valve 6, and an intake tube 7 are arranged downstream of an intake opening 4 for taking in fresh air. The intake tract opens into an internal combustion chamber 30 delimited by the cylinder 2 and the piston 3. The fresh air required for combustion is routed into the combustion chamber 30 by way of the intake tract, with the fresh air supply being controlled by opening and closing an inlet valve 8. The internal combustion engine 1 shown here is an internal combustion engine 1 with direct fuel injection, in which the fuel needed for the combustion is directly injected into the combustion chamber 30 by way of an injection valve 9. An ignition plug 10 protruding into the combustion chamber 30 is likewise used to ignite the combustion. The combustion exhaust gases are discharged into an exhaust gas tract of the internal combustion engine 1 by way of an outlet valve 11 and are cleaned by means of an exhaust gas catalytic converter 12 arranged in the exhaust gas tract. A lambda probe 16 is also arranged in the exhaust gas tract.

The transmission to a drive train of a motor vehicle (not shown), which is driven by the internal combustion engine, takes place by way of a crankshaft 13 coupled to the piston 3. The internal combustion engine 1 also has a speed sensor 15 for detecting the speed of the crankshaft 13, a coolant temperature sensor 14, an ambient temperature sensor 31 and an electrical starter device 32 for starting the internal combustion engine 1.

The internal combustion engine 1 has a fuel supply system, which comprises a fuel tank 17 and a fuel pump 18 arranged therein. The fuel is fed to an accumulator 20 by means of the fuel pump 18 by way of a supply line 19. This is a shared accumulator 20, from which the injection valves 9 are supplied with pressurized fuel for several cylinders 2. A fuel filter 21 and a high pressure pump 22 are also arranged in the supply line 19. The high pressure pump 22 is used to supply the fuel supplied at relatively low pressure (approx 3 bar) through the fuel pump 18 to the accumulator 20 at high pressure (typically up to 150 bar).

The internal combustion engine 1 is assigned a control device 26, which is connected to all actuators and sensors of the internal combustion engine 1 by way of signal and data lines. Characteristic field-based engine control functions (KF1 to KF5) are implemented in the control device 26 using software. In particular, a so-called automatic engine cut-off and starting system 33 is implemented in the control device, which cuts off and starts the combustion engine 1 independently from a motor vehicle driver (not shown). Based on the measured values of the sensors and the characteristic field-based engine control functions, control signals are sent to the actuators of the internal combustion engine 1 and of the fuel supply system. The control device 26 is tangibly coupled to the fuel pump 18, the air mass sensor 5, the throttle valve 6, the ignition plug 10, the injection valve 9, the coolant temperature sensor 14, the speed sensor 15, the lambda sensor 16, the ambient temperature sensor 31 and the starter device 32 by way of data and signal lines.

FIG. 2 shows an exemplary embodiment of a control method for the internal combustion engine 1 described in FIG. 1 in the form of a flow chart. The method is started with step 200, for instance in the case of the initial commissioning of the internal combustion engine 1. As is still clear below, sub functions of the method run from this point in time in the case of a cut-off and/or switched-on internal combustion engine 1.

The method is explained based on a start-up of the internal combustion engine 1 in step 201. The start-up of the internal combustion engine can take place here by the driver of the motor vehicle or by means of the automatic engine cut-off and starting system.

Step 202 determines the downtime, which elapses from the last cut-off to the start-up of the internal combustion engine 1 in step 201. This may take place for instance by means of a timing device implemented in the control device 26. The coolant temperature and the ambient temperature of the internal combustion engine 1 is also determined in step 202. The determination of these variables (downtime, coolant temperature, ambient temperature) advantageously takes place immediately after detecting a request signal for the start-up of the internal combustion engine 1.

A variable is determined in step 203, said variable being representative of the work which has been performed by the internal combustion engine 1 since the last start-up (step 201). This variable is determined continually from the start-up of the internal combustion engine 1.

The variable may be the fresh air quantity for instance, which is fed to the internal combustion engine since the last start-up. The fresh air quantity is detected by the air quantity sensor 5 and is added by a corresponding computing function in the control device 26.

Alternatively hereto, the variable may be the quantity of fuel, which is metered into the internal combustion engine 1 since the last start-up (step 201). The metered fuel quantity may then be determined for instance by means of a computing function implemented in the control device 26 as a function of the fuel pressure in the accumulator 20 and the opening times of the injection valves 9.

Alternatively, the variable may be the temporal integral of the torque produced by the internal combustion engine 1 since the last start-up (step 201). The produced torque can either be determined directly by means of a torque sensor (not shown) or by means of a torque model implemented in the control device 26.

As the variable represents a measure of the work performed by the internal combustion engine since the last start-up, it is also representative of the combustion heat released in this way, which results in the engine block and/or the internal combustion engine 1 warming up. The variable therefore indirectly permits a conclusion to be drawn in respect of the temperature of the internal combustion engine 1.

A threshold value is also determined in step 203, said threshold value still being needed during the further course of the method. The threshold value may advantageously be determined as a function of the determined downtime and/or the coolant temperature and/or the ambient temperature of the internal combustion engine 1 at the point in time of the start-up of the internal combustion engine 1. The significance of the threshold value becomes clear during the further course of the description of the exemplary embodiment.

The variable is determined continuously or at regular intervals until the internal combustion engine is cut-off again.

Step 204 checks whether a request to cut off the internal combustion engine 1 by the automatic engine cut-off and starting system 33 is present. If this is not the case, the request is repeated.

With a positive result of the query, a check is carried out in step 205 to determine whether the determined variable exceeds the predetermined threshold value. If this is not the case, a cut-off of the internal combustion engine 1 is prevented by the automatic engine cut-off and starting system 3 and the method returns to step 204.

With a positive result of the query in step 205, the method continues with step 206, in which the cut-off of the internal combustion engine 1 is allowed by means of the automatic engine cut-off and starting system 33. In step 207, the internal combustion engine 1 is cut off by means of the automatic engine cut-off and starting system 33. This may be the case for instance when stopping at traffic lights, where the motor vehicle is still and the internal combustion engine 1 is idling. In this case, the drive force of the internal combustion engine 1 is not needed and is cut off for the purpose of saving fuel.

In step 208, a check is carried out to determine whether the condition and/or the conditions are fulfilled in respect of restarting the internal combustion engine 1. This may be the case if the driver of the motor vehicle expresses his/her desire to drive further by putting it in gear or pushing on the accelerator pedal. With a negative result of the query in step 208, this is repeated. With a positive result, the method continues with step 201, in which the internal combustion engine 1 is started by the automatic engine cut-off and starting system 33.

The described method is advantageous in that the cut-off of the internal combustion engine 1 takes place as a function of the variable which is representative of the work performed by the internal combustion engine 1 since its last start-up. As the performed work also represents a measure of the heat input into the engine block which is caused by the motor-driven combustion, the cut-off of the internal combustion engine by the automatic engine cut-off and starting system 33 is indirectly allowed or prevented as a function of the temperature of the internal combustion engine 1. The described method represents an alternative to the prior art, in which the cut-off takes place as a function of the output signal of a coolant temperature sensor. The method is characterized by high reliability, precision and operational safety.

What is claimed is:

1. A method for controlling an internal combustion engine for a motor vehicle having an automatic engine cut-off and starting system, operable to cut off and start the internal combustion engine independently from the driver of the motor vehicle, comprising:
    detecting a start-up of the internal combustion engine,
    determining the value of a variable corresponding to work performed by the internal combustion engine since the start-up, and
    cutting off the internal combustion engine by the automatic engine cut-off and starting system based at least in part on the value of the variable.

2. The method according to claim 1, wherein the variable represents a quantity of fuel which was metered into the internal combustion engine since the last start-up.

3. The method according to claim 1, wherein the variable represents a fresh air quantity which was fed to the internal combustion engine since the last start-up.

4. The method according to claim 1, wherein the variable represents a torque produced by the internal combustion engine and further comprising cutting off the internal combustion engine based at least in part on a temporal integral of the variable.

5. The method according to claim 1, further comprising cutting off the internal combustion engine if the value of the variable exceeds a predetermined threshold value.

6. The method according to claim 5, further comprising the threshold value determined as a function of a temperature of a coolant of the internal combustion engine during start-up.

7. The method according to claim 5, further comprising the threshold value determined as a function of a downtime of the internal combustion engine until the start-up.

8. The method according to claim 5, further comprising the threshold value determined as a function of an ambient temperature during start-up.

9. A control device for an internal combustion engine of a motor vehicle with an automatic engine cut-off and starting system, which cuts off and starts the internal combustion engine independently from a driver of the motor vehicle, wherein the control device is operable to:
    detect a start-up of the internal combustion engine,
    determine a variable, which represents a measure of the work performed by the internal combustion engine since the start-up, and
    control the automatic engine cut-off and starting system to cut-off the internal combustion as a function of the variable.

10. The method according to claim 9, wherein the variable being the quantity of fuel which was metered into the internal combustion engine since the last start-up.

11. The method according to claim 9, wherein the variable being the fresh air quantity, which was fed to the internal combustion engine since the last start-up.

12. The method according to claim 9, wherein the torque produced by the internal combustion engine being determined and the variable being the temporal integral of the torque produced by the internal combustion engine since the start-up.

13. The method according to claim 9, wherein the cut-off of the internal combustion engine taking place by means of the automatic engine cut-off and starting system if the variable exceeds a predetermined threshold value.

14. The method according to claim 13, wherein the control device is further operable to determine the threshold value as a function of the temperature of a coolant of the internal combustion engine during start-up.

15. The method according to claim 13, wherein the control device is further operable to determine the threshold value as a function of the downtime of the internal combustion engine until the start-up.

16. The method according to claim 13, wherein the control device is further operable to determine the threshold value as a function of the ambient temperature of the motor vehicle during start-up.

17. A system for controlling an internal combustion engine for a motor vehicle comprising:
    an automatic engine cut-off and starting system, operable to cut off and start the internal combustion engine independently from the driver of the motor vehicle,
    a software controlled control device coupled with said internal combustion engine via sensors and actuators,
    wherein the software controlled control device receives at least one sensor signal to detect a start-up of the internal combustion engine, and is operable to determine a value for a variable corresponding to the work performed by the internal combustion engine since the start-up, and
    wherein the software controlled control device controls said automatic engine cut-off and starting system to cut off the internal combustion engine as a function based at least in part on the determined value of the variable.

18. The system according to claim 17, wherein the variable represents a quantity of fuel metered into the internal combustion engine since the last start-up.

19. The system according to claim 17, wherein the variable represents a fresh air quantity fed to the internal combustion engine since the last start-up.

20. The system according to claim 17, wherein the control device receives at least one sensor signal corresponding to a torque produced by the internal combustion engine and the function includes a temporal integral of the torque produced by the internal combustion engine since the start-up.

* * * * *